Oct. 18, 1927.
G. W. COOK
1,646,012
ADJUSTING DEVICE FOR BRAKE ACTUATING MECHANISMS
Filed Dec. 5, 1925
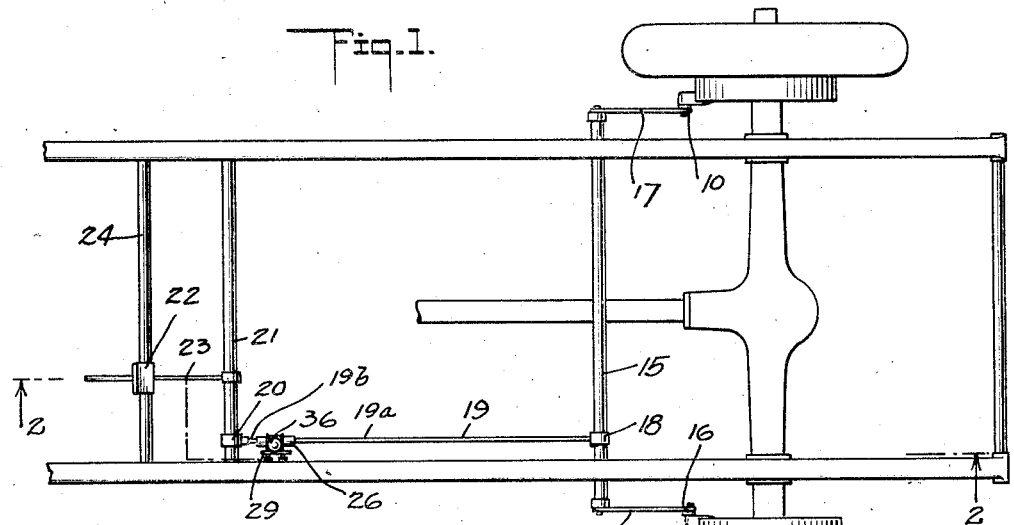
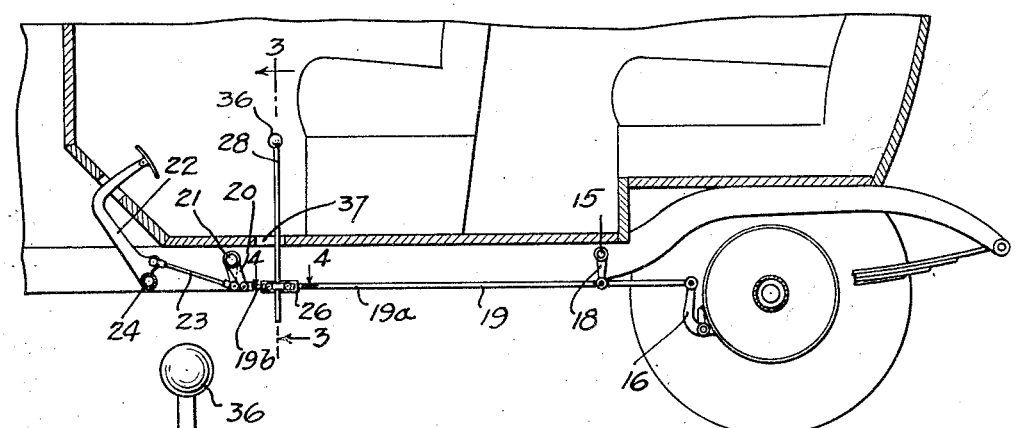
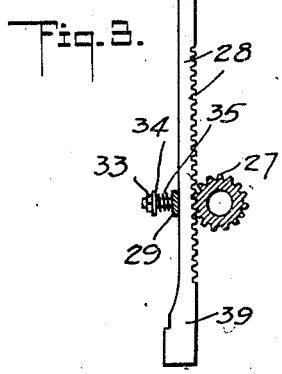
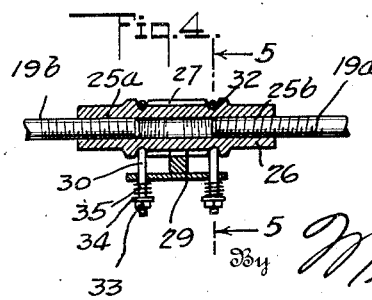
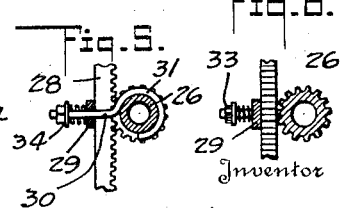
Inventor
GEORGE W. COOK.
By Munn & Co.
Attorney Patented Oct. 18, 1927.

1,646,012

UNITED STATES PATENT OFFICE.

GEORGE W. COOK, OF LOS ANGELES, CALIFORNIA.

ADJUSTING DEVICE FOR BRAKE-ACTUATING MECHANISMS.

Application filed December 5, 1925. Serial No. 73,356.

My invention relates to brakes for vehicles, and more particularly to foot operated mechanical brakes.

The purpose of my invention is the provision of a simple, inexpensive and durable device which is readily operable to adjust the actuating mechanism of the vehicle brake so that depression of the brake pedal will be effective to secure proper brake application.

My invention is particularly designed to provide a simple manual adjustment of a brake actuating mechanism while the vehicle is in motion so that if the present adjustment of the actuating mechanism be insufficient to cause a proper brake application upon depression of the pedal the mechanism can be readjusted to insure proper braking when the pedal is depressed.

My invention is particularly useful when a vehicle is descending a precipitous highway or under any condition in which a prolonged brake application is necessary or under such circumstance should the actuating mechanism require adjustment to afford proper brake application which can be instantly effected by the driver of the vehicle while the latter is in motion.

I will describe only one form of adjusting device for brake actuating mechanisms embodying my invention, and will then point out the novel features thereof in claims.

In the drawings—

Figure 1 is a view showing in top plan one form of adjusting device embodying my invention in applied position to the braking mechanism of a vehicle;

Figure 2 is a vertical sectional view taken on the line 2—2 of Figure 1;

Figure 3 is a vertical sectional view taken on the line 3—3 of Figure 2;

Figure 4 is a horizontal sectional view taken on the line 4—4 of Figure 2;

Figure 5 is a vertical sectional view taken on the line 5—5 of Figure 4;

Figure 6 is a fragmentary vertical sectional view similar to Figure 3, showing the locked position of the racked bar embodied in the device.

Similar reference characters refer to similar parts in each of the views of the drawing.

Referring to the drawings, my invention in its present embodiment is shown incorporated in a conventional form of brake actuating mechanism which includes a shaft 15 extending transversely of the vehicle frame and operatively connected at its ends to brake band actuating levers 16 through the medium of links 17. An arm 18 is fixed to the shaft 15, and extending forwardly from this arm is a rod 19 having operative connection at its forward end with an arm 20 of a shaft 21. The shaft in turn is operatively connected to a pedal 22 through a connection 23, the pedal being pivotally mounted in the shaft 24 so that when the pedal is depressed from the position shown in Figure 2 the mechanism described will be actuated to move the lever 16 to effect the brake application.

The adjusting device embodying my invention comprises a division of the rod 19 into two sections indicated at 19ª and 19ᵇ, respectively, and the confronting ends of these rod sections are oppositely threaded, as indicated at 25ª and 25ᵇ in Figure 4 for interior engagement with a tubular member or sleeve 26. The threaded rod sections and sleeve constitute a turnbuckle, and this turnbuckle serves to provide an adjustment between the rod sections whereby the length of the rod can be increased or decreased at will, depending upon the adjustment of the sleeve 26.

The member 26 in the present instance is shown provided exteriorly with ribs or teeth 27 extending longitudinally of the member and circumferentially spaced to form, in effect, a gear which is adapted to mesh with a racked bar 28 so that by moving the bar longitudinally it will co-operate with the gear in effecting rotation of the member 26 in one direction or the other, depending upon the direction of movement of the bar 28.

The racked bar 28 is guided in its movement and held in proper meshing relation to the gear of the turnbuckle by means of a strap or plate 29 supported for horizontal movement on a pair of brackets 30 having hooked ends 31 seated in grooves 32 of the member 26. The projecting ends of the brackets 30 are threaded to receive nuts 33, and washers 34 are movable on the brackets at the inner side of the nuts for engagement with springs 35 which yieldably urge the strap 29 inwardly on the brackets and against the rack bar 28. The urging action of the springs 25 is such as to permit sliding movement of the racked bar with respect to the plate 29, but they serve to set up sufficient friction between the plate 29 and the racked bar to hold the bar against accidental movement so that an adjustment of the member 26 can be maintained.

As shown in Figure 3 the upper end of the racked bar 28 is provided with a head 36 which is adapted to be gripped in manually operating the bar, and as shown in Figure 2 an opening 37 is formed in the floor of the vehicle body through which the racked bar is extended so that the head 36 is within convenient reach of the driver of the vehicle. The lower end of the racked bar is provided with a shouldered enlargement 39 which functions to limit the upward movement of the racked bar to the extent that it can be withdrawn from out of engagement with the gear 27.

In practice, the conventional brake actuating mechanism because of protracted use loses its adjustment to the extent that full depression of the pedal 22 will be ineffective to secure a proper brake application. It is appreciated that the conventional brake mechanism does provide means for adjustment, but to effect such adjustment it is necessary that the vehicle be brought to a standstill and the operator crawl beneath the vehicle. My invention provides an emergency adjustment for the actuating mechanism which is capable of being actuated while the vehicle is under way and without the necessity of the operator leaving the seat.

In operation, the member 26 of the turnbuckle can be rotated by a depression of the racked bar 28 to shorten the rod 19 sufficiently so that when the pedal 22 is depressed the proper brake application is effected. Following an adjustment, should it be desired to securely lock the racked bar in depressed position, such bar can be rotated ninety degrees to the position shown in Figure 6, whence its toothed surface is moved out of engagement with the gear 27 and a flat untoothed surface presented to the gear whereby accidental rotation of the member 26 is prevented. In moving the racked bar to its locked position it will be understood that the plate 29 will yield to the rotative movement of the bar, but following such rotation the plate will again function to hold the bar against downward movement.

Although I have herein shown and described only one form of adjusting device for brake actuating mechanisms embodying my invention, it is to be understood that various changes and modifications may be made therein without departing from the spirit of the invention and the spirit and scope of the appended claims.

I claim:

1. In a brake actuating mechanism having a two-part rod, a turnbuckle connecting the parts of the rod, and an actuating member adapted to extend upwardly through the floor of the vehicle and having operative connection with the turnbuckle to actuate the latter.

2. An adjusting device for brake actuating mechanisms comprising a two part rod, with the parts thereof oppositely threaded, a tubular member threadedly receiving the threaded parts of the rod, a gear on the member, a racked bar, and yieldable means for holding the racket bar in meshing relation to said gear and permit movement of the bar to actuate the gear in effecting rotation of the member.

3. An adjusting device for brake actuating mechanisms as embodied in claim 2, wherein the last means comprises brackets, a plate movable on the brackets, and springs for urging the plate into engagement with the racked bar.

4. An adjusting device for brake actuating mechanisms as embodied in claim 2, wherein the last means comprises brackets, a plate movable on the brackets, and springs for urging the plate into engagement with the racked bar, said racked bar being rotatable about its own axis to move the toothed surface out of engagement with said gear whereby the gear and hence the member can be locked against rotation.

GEORGE W. COOK.